(12) United States Patent
Tashiro et al.

(10) Patent No.: US 9,854,124 B2
(45) Date of Patent: Dec. 26, 2017

(54) IMAGE FORMING APPARATUS AND IMAGE FORMING METHOD

(71) Applicant: KYOCERA Document Solutions Inc., Osaka-shi, Osaka (JP)

(72) Inventors: Michiko Tashiro, Osaka (JP); Emi Tennichi, Osaka (JP); Shinichi Nakanishi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/295,729

(22) Filed: Oct. 17, 2016

(65) Prior Publication Data

US 2017/0111541 A1 Apr. 20, 2017

(30) Foreign Application Priority Data

Oct. 19, 2015 (JP) .................................. 2015-205210

(51) Int. Cl.
*H04N 1/23* (2006.01)
*H04N 1/00* (2006.01)
*H04N 1/32* (2006.01)

(52) U.S. Cl.
CPC ......... *H04N 1/2369* (2013.01); *H04N 1/0057* (2013.01); *H04N 1/00204* (2013.01); *H04N 1/32496* (2013.01); *H04N 2201/0094* (2013.01)

(58) Field of Classification Search
None
See application file for complete search history.

(56) References Cited

U.S. PATENT DOCUMENTS

| 2006/0066888 A1* | 3/2006 | Uemura | ................ G06F 3/1204 358/1.13 |
| 2013/0170003 A1* | 7/2013 | Yabuuchi | ............... H04N 1/407 358/498 |

FOREIGN PATENT DOCUMENTS

JP 2003101757 A 4/2003

* cited by examiner

*Primary Examiner* — Fan Zhang
(74) *Attorney, Agent, or Firm* — Alleman Hall Creasman & Tuttle LLP

(57) ABSTRACT

An image forming apparatus includes a receiving processing portion, a first printing processing portion, and a second printing processing portion. The receiving processing portion is configured to receive an operation for designating a designation page to which a predetermined printing condition is to be applied, of a document including a plurality of pages. The first printing processing portion is configured to print a partial document including the designation page, of the document. The second printing processing portion is configured to print a remaining document obtained by excluding the partial document from the document, in accordance with a predetermined confirmation operation after the printing by the first printing processing portion.

6 Claims, 4 Drawing Sheets

IMAGE FORMING APPARATUS AND IMAGE FORMING METHOD

INCORPORATION BY REFERENCE

This application is based upon and claims the benefit of priority from the corresponding Japanese Patent Application No. 2015-205210 filed on Oct. 19, 2015, the entire contents of which are incorporated herein by reference.

BACKGROUND

The present disclosure relates to an image forming apparatus and an image forming method.

In an image forming apparatus such as a copy machine, image data is read from each page of a document, and each page of the document is printed on a sheet on the basis of the read image data. Meanwhile, an image forming apparatus has been known which inserts an interleaving paper before a page of a document designated by a user and prints the document. In addition, an image forming apparatus has been known which prints a document such that a page of the document designated by a user is always located on the front surface of a sheet. In these image forming apparatuses, a page of the document is designated by the user, and a printing process of the document is executed. For example, in such a type of image forming apparatus, in order to confirm whether there is an error in page designation, the designated page and a page previous thereto by 1 page are printed before execution of the printing process.

SUMMARY

An image forming apparatus according to one aspect of the present disclosure includes a receiving processing portion, a first printing processing portion, and a second printing processing portion. The receiving processing portion is configured to receive an operation for designating a designation page to which a predetermined printing condition is to be applied, of a document including a plurality of pages. The first printing processing portion is configured to print a partial document including the designation page, of the document. The second printing processing portion is configured to print a remaining document obtained by excluding the partial document from the document, in accordance with a predetermined confirmation operation after the printing by the first printing processing portion.

An image forming method according to another aspect of the present disclosure includes a first step, a second step, and a third step. In the first step, an operation for designating a designation page to which a predetermined printing condition is to be applied, of a document including a plurality of pages, is received. In the second step, a partial document including the designation page, of the document, is printed. In the third step, a remaining document obtained by excluding the partial document from the document is printed in accordance with a predetermined confirmation operation after the printing in the second step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings in order to allow understanding of the present disclosure. It should be noted that the following embodiment is an example embodying the present disclosure and does not limit the technical scope of the present disclosure.

[Schematic Configuration of Image Forming Apparatus 10]

First, the schematic configuration of an image forming apparatus 10 according to the embodiment of the present disclosure will be described with reference to FIGS. 1 and 2. Here, FIG. 1 is a cross-sectional schematic diagram showing the configuration of the image forming apparatus 10.

Figure 1:
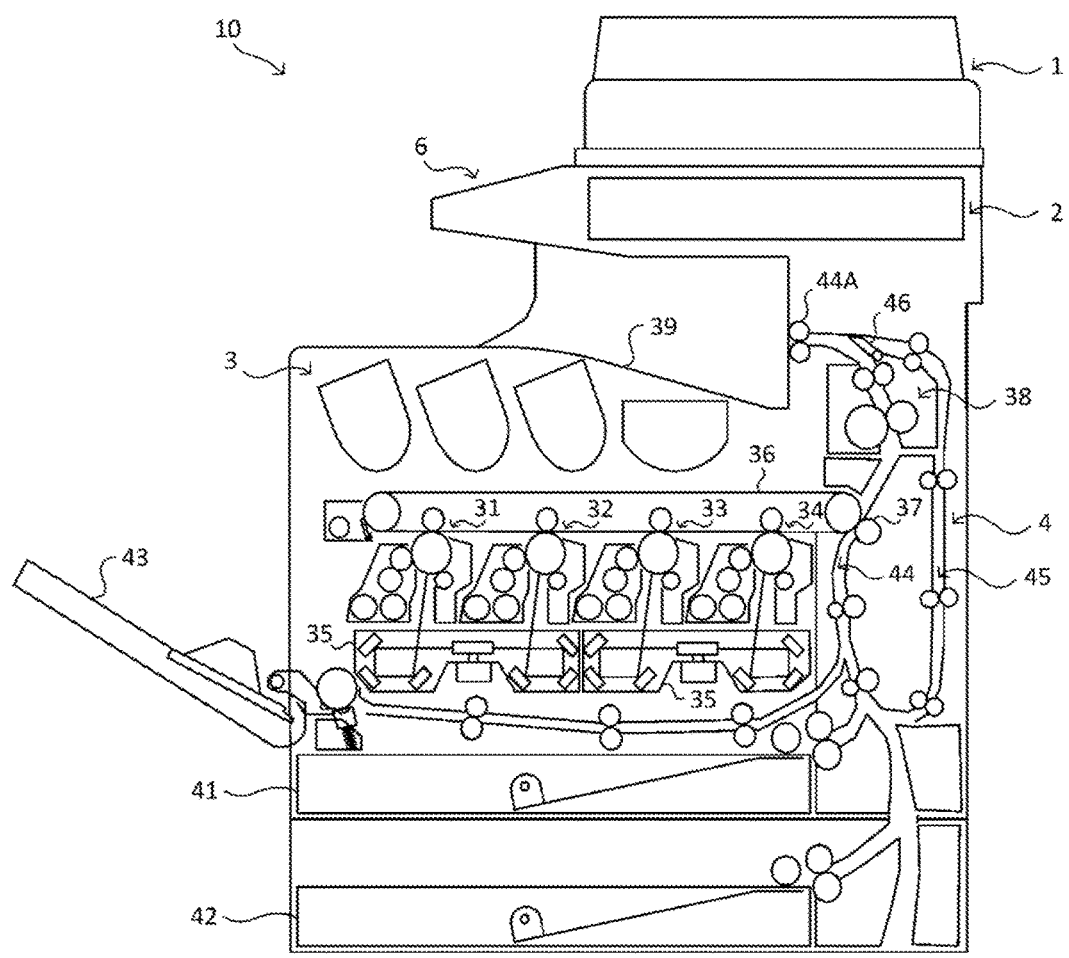
FIG. 1 is a diagram showing the configuration of an image forming apparatus according to an embodiment of the present disclosure.
Figure 2:
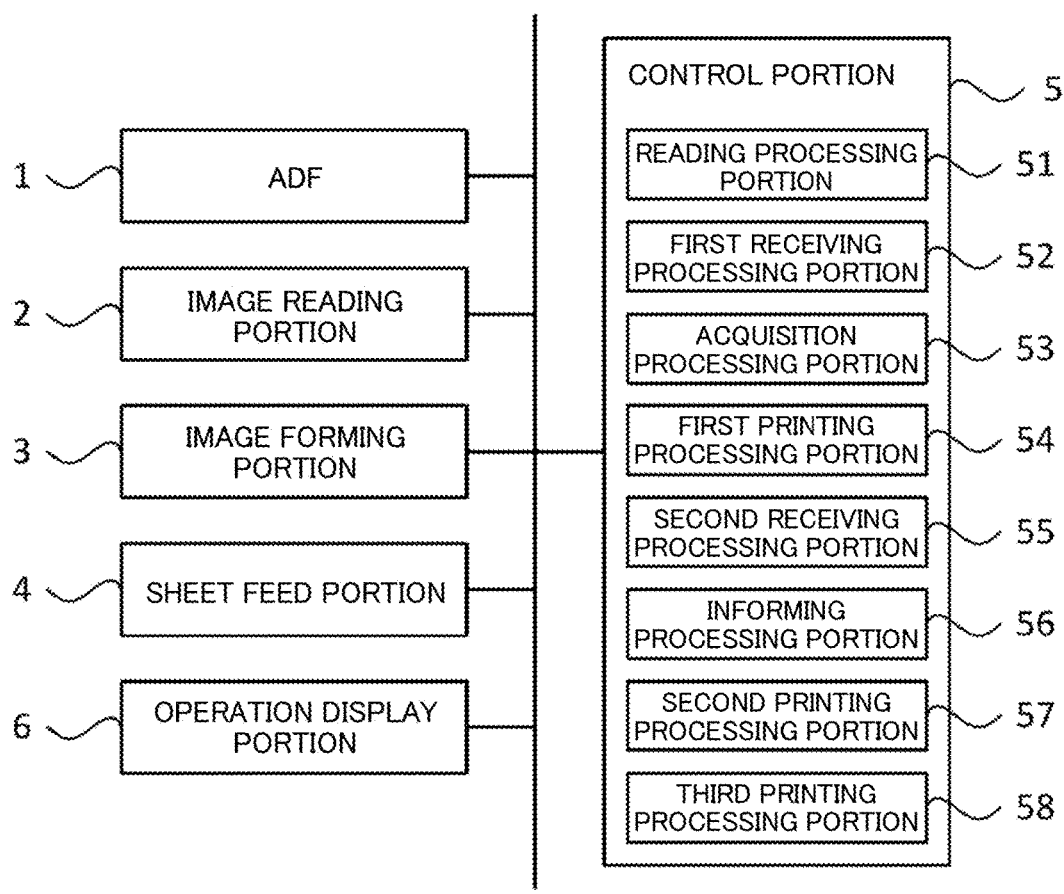
FIG. 2 is a block diagram showing the system configuration of the image forming apparatus according to the embodiment of the present disclosure.

As shown in FIGS. 1 and 2, the image forming apparatus 10 includes an ADF 1, an image reading portion 2, an image forming portion 3, an sheet feed portion 4, a control portion 5, and an operation display portion 6. The image forming apparatus 10 is a multifunction peripheral having a plurality of functions such as a facsimile function or a copy function as well as a scanning function to read image data from a document and a printing function to form an image on the basis of image data. In addition, the present disclosure is applicable to image forming apparatuses such as a printer apparatus, a facsimile apparatus, and a copy machine.

The ADF 1 is an automatic document feeder that includes a document set portion, a plurality of conveying rollers, a document holder, and a sheet discharge portion, which are not shown, and conveys a document to be read by the image reading portion 2. The image reading portion 2 includes a document table, a light source, a plurality of mirrors, an optical lens, and a charge coupled device (CCD), which are not shown, and is capable of reading image data from a document.

The image forming portion 3 is capable of executing an image forming process (printing process) of forming a color or monochrome image by electrophotography on the basis of image data read by the image reading portion 2. In addition, the image forming portion 3 is capable of executing the printing process on the basis of image data inputted from an information processing apparatus such as an external personal computer.

Specifically, as shown in FIG. 1, the image forming portion 3 includes a plurality of image forming units 31 to 34, a laser scanning unit (LSU) 35, an intermediate transfer belt 36, a secondary transfer roller 37, a fixing device 38, and a sheet discharge tray 39. The image forming unit 31 is an electrophotographic type image forming unit corresponding to C (cyan), the image forming unit 32 is an electrophotographic type image forming unit corresponding to M (magenta), the image forming unit 33 is an electrophotographic type image forming unit corresponding to Y (yellow), and the image forming unit 34 is an electrophotographic type image forming unit corresponding to K (black). Each of the image forming units 31 to 34 includes a photosensitive drum, a charging device, a developing device, a primary transfer roller, and a cleaning device, etc.

The laser scanning unit 35 applies laser light based on image data to each photosensitive drum to form, on each photosensitive drum, an electrostatic latent image based on the image data. Then, a toner image of each color developed on each photosensitive drum by the developing device is intermediately transferred onto the intermediate transfer belt 36, and then is transferred onto a sheet supplied from the sheet feed portion 4, by the secondary transfer roller 37. Then, on the sheet onto which each toner image has been transferred, a color image is formed by each toner image being melted and fixed by the fixing device 38, and the sheet is discharged to the sheet discharge tray 39.

The sheet feed portion 4 conveys a sheet on which an image is to be formed by the image forming portion 3. Specifically, as shown in FIG. 1, the sheet feed portion 4 includes a first sheet feed cassette 41, a second sheet feed cassette 42, a manual tray 43, a first conveyance path 44, a second conveyance path 45, and a switching member 46.

Sheets are placed on the first sheet feed cassette 41, the second sheet feed cassette 42, and the manual tray 43. The sheet feed portion 4 conveys the sheets from the first sheet feed cassette 41, the second sheet feed cassette 42, and the manual tray 43 to the sheet discharge tray 39. Here, the sheet feed portion 4 is an example of a sheet conveying portion in the present disclosure. The sheet discharge tray 39 is an example of a discharge portion in the present disclosure. The first sheet feed cassette 41, the second sheet feed cassette 42, and the manual tray 43 are an example of a plurality of sheet placement portions in the present disclosure. The first sheet feed cassette 41 is an example of a first sheet placement portion in the present disclosure. The manual tray 43 is an example of a second sheet placement portion in the present disclosure. In the following description, the first sheet feed cassette 41, the second sheet feed cassette 42, and the manual tray 43 are sometimes referred to collectively as sheet placement portion.

The first conveyance path 44 is a sheet conveyance path extending from the first sheet feed cassette 41, the second sheet feed cassette 42, and the manual tray 43 to the sheet discharge tray 39, and is formed by a pair of conveyance guide members provided within a housing of the image forming apparatus 10. On the first conveyance path 44, a plurality of rollers including a pick-up roller, a registration roller, and discharge rollers 44A are provided. In the sheet feed portion 4, by the plurality of rollers rotating by a driving force transmitted from a motor that is not shown, the sheets placed on the first sheet feed cassette 41, the second sheet feed cassette 42, and the manual tray 43 are conveyed to the sheet discharge tray 39.

The second conveyance path 45 is a sheet conveyance path connecting the downstream side of the fixing device 38 and the upstream side of the registration roller on the first conveyance path 44, and is formed by a pair of conveyance guide members provided within the housing of the image forming apparatus 10. On the second conveyance path 45, a plurality of rollers for conveying the sheets are provided. The switching member 46 is provided at a merging portion at which the downstream side on the first conveyance path 44 merges with the second conveyance path 45. The switching member 46 is capable of opening any one of the first conveyance path 44 and the second conveyance path 45 and also closing the other.

The image forming apparatus 10 is capable of performing printing on both surfaces of the sheet conveyed by the sheet feed portion 4. Specifically, when printing is performed on both surfaces of the sheet, at timing at which the rear end of the sheet having an image formed thereon by the image forming portion 3 passes through the merging portion, the control portion 5 actuates the switching member 46 to close the first conveyance path 44 and open the second conveyance path 45. Subsequently, after the second conveyance path 45 is opened, the control portion 5 causes the discharge rollers 44A to reversely rotate. Accordingly, the sheet is sent to the second conveyance path 45 and conveyed to an image forming position at which an image is formed by the image forming portion 3, in a state where the front surface and the back surface of the sheet are inverted.

The control portion 5 includes control devices such as a CPU, a ROM, a RAM, and an EEPROM that are not shown. The CPU is a processor that executes various calculation processes. The ROM is a non-volatile storage portion in which information such as a control program for causing the CPU to execute various processes is stored in advance. The RAM is a volatile storage portion, and the EEPROM is a non-volatile storage portion. The RAM and the EEPROM are used as temporary storage memories (working areas) for various processes executed by the CPU. In the control portion 5, various control programs stored in advance in the ROM are executed by the CPU. Accordingly, the image forming apparatus 10 is controlled centrally by the control portion 5. The control portion 5 may be composed of an electronic circuit such as an integrated circuit (ASIC), or may be a control portion provided independently of a main control portion that centrally controls the image forming apparatus 10.

The operation display portion 6 includes: a display portion, such as a liquid crystal display, which displays various kinds of information in accordance with control instructions from the control portion 5; and an operation portion, such as an operation key or a touch panel, which inputs various kinds of information to the control portion 5 in accordance with operations of a user.

Meanwhile, an image forming apparatus has been known which inserts an interleaving paper before a page of a document designated by a user and prints the document. In addition, an image forming apparatus has been known which prints a document such that a page of the document designated by a user is always located on the front surface of a sheet. In these image forming apparatuses, a page of the document is designated by the user, and the printing process of the document is executed. For example, in such a type of image forming apparatus, in order to confirm whether there is an error in page designation, the designated page and a page previous thereto by 1 page are printed before execution of the printing process.

Here, in the image forming apparatus, the printing result of a part of a printed matter printed by the printing process may overlap the printing result of a printed matter printed for confirming page designation. In this case, in the printing process, it is a waste to print the printed matter whose printing result overlaps the printing result of the printed matter printed for confirming page designation. On the other hand, in the image forming apparatus 10 according to the embodiment of the present disclosure, it is possible to inhibit a printed matter whose printing result overlaps the printing result of a printed matter printed for confirming page designation, from being printed.

Specifically, a printing control program for causing the CPU to execute a later-described printing control process (see a flowchart in FIG. 3) is stored in advance in the ROM of the control portion 5. The printing control program may be stored in a non-transitory computer-readable storage medium such as a CD, a DVD, or a flash memory, and may be read from the storage medium and installed into a storage portion such as the EEPROM.

As shown in FIG. 2, the control portion 5 includes a reading processing portion 51, a first receiving processing portion 52, an acquisition processing portion 53, a first printing processing portion 54, a second receiving processing portion 55, a informing processing portion 56, a second printing processing portion 57, and a third printing processing portion 58. Specifically, the control portion 5 executes the printing control program stored in the ROM, with the CPU. Accordingly, the control portion 5 is capable of functioning as the reading processing portion 51, the first receiving processing portion 52, the acquisition processing portion 53, the first printing processing portion 54, the second receiving processing portion 55, the informing processing portion 56, the second printing processing portion 57, and the third printing processing portion 58.

The reading processing portion 51 controls the ADF 1 and the image reading portion 2 to execute an image reading process of reading an image on each page of a document placed on the document set portion of the ADF 1. Specifically, the reading processing portion 51 controls the ADF 1 to sequentially convey a plurality of sheets of a document placed on the document set portion. In addition, the reading processing portion 51 controls the image reading portion 2 to read an image on each page from the document conveyed by the ADF 1.

The first receiving processing portion 52 receives an operation of designating a designation page to which a predetermined printing condition is to be applied, of a document including a plurality of pages. For example, the first receiving processing portion 52 receives a designation operation of designating the designation page to which the printing condition is to be applied, of a document including a plurality of pages read by the reading processing portion 51. Here, the first receiving processing portion 52 is an example of a receiving processing portion in the present disclosure.

For example, the first receiving processing portion 52 causes the operation display portion 6 to display a setting operation screen used for a designation operation for designating the designation page. For example, on the setting operation screen, it is possible to set the printing condition and perform the designation operation by inputting a page number of the document. In addition, on the setting operation screen, it is possible to set either single-sided printing or double-sided printing as a document printing mode. Moreover, on the setting operation screen, it is possible to perform an execution process for executing the printing process by the first printing processing portion 54 on the basis of the set printing mode, the set printing condition, and the set designation page.

Here, the printing condition includes a first printing condition, a second printing condition, and a third printing condition. In the image forming apparatus 10, any one or only two of the first printing condition, the second printing condition, and the third printing condition of the printing condition may be settable.

The first printing condition is to cause the sheet feed portion 4 to discharge the sheet from the sheet placement portion different from the sheet placement portion that is selected in advance as a conveyance source of a sheet to be used for printing, to the sheet discharge tray 39 at timing between printing of the designation page and printing of the previous page of the designation page. For example, in the image forming apparatus 10, the first sheet feed cassette 41 is selected in advance as a conveyance source of a sheet to be used for printing. In addition, in the image forming apparatus 10, the second sheet feed cassette 42 is set as the sheet placement portion different from the first sheet feed cassette 41.

For example, when, on the setting operation screen, the printing condition and the printing mode are set to the first printing condition and single-sided printing, respectively, and the designation operation is performed, and the document is printed, a printed matter is outputted in which the sheet placed on the second sheet feed cassette 42 is inserted between the sheet on which the designation page is printed and the sheet on which the previous page of the designation page is printed.

When, on the setting operation screen, the printing condition and the printing mode are set to the first printing condition and double-sided printing, respectively, and the designation operation is performed, and the document is printed, the printing result is different depending on whether a printing position, on a sheet, for the designation page is the front surface or the back surface of the sheet. Specifically, when the printing position for the designation page is set to the front surface of the sheet, a printed matter is outputted in which the sheet placed on the second sheet feed cassette 42 is inserted between the sheet on the front surface of which the designation page is printed and the sheet on the back surface of which the previous page of the designation page is printed. When the printing position for the designation page is set to the back surface of the sheet, the printing position for the designation page is changed to the front surface of the sheet to be conveyed next by the sheet feed portion 4, and a printed matter is outputted in which the sheet placed on the second sheet feed cassette 42 is inserted between the sheet on the front surface of which the designation page is printed and the sheet on the front surface of which the previous page of the designation page is printed.

The second printing condition is to print the designation page on the sheet conveyed from the second sheet feed cassette 42 different from the first sheet feed cassette 41, which is selected in advance as a conveyance source of a sheet to be used for printing.

For example, when, on the setting operation screen, the printing condition and the printing mode are set to the second printing condition and single-sided printing, respectively, and the designation operation is performed, and the document is printed, a printed matter is outputted in which the designation page is printed on the sheet placed on the second sheet feed cassette 42.

When, on the setting operation screen, the printing condition and the printing mode are set to the second printing condition and double-sided printing, respectively, and the designation operation is performed, and the document is printed, the printing result is different depending on whether the printing position for the designation page is set to the front surface or the back surface of the sheet. Specifically, when the printing position for the designation page is set to the front surface of the sheet, a printed matter is outputted in which the designation page is printed on the front surface of the sheet placed on the second sheet feed cassette 42. When the printing position for the designation page is set to the back surface of the sheet, the printing position for the designation page is changed to the front surface of the sheet to be conveyed next by the sheet feed portion 4, and a printed matter is outputted in which the designation page is printed on the front surface of the sheet placed on the second sheet feed cassette 42.

The third printing condition is to change the setting of the printing position for the designation page to the front surface of the sheet to be conveyed next by the sheet feed portion 4, when the printing position, for the designation page, on the sheet conveyed by the sheet feed portion 4 is set to the back surface of the sheet. The third printing condition is settable only when the printing mode is set to double-sided printing on the setting operation screen.

The acquisition processing portion 53 acquires the coverage rate of a first reference page that is one of or both the previous page and the next page of the designation page designated by the designation operation. For example, even when the printing mode is set to either single-sided printing or double-sided printing, the acquisition processing portion 53 acquires the coverage rate of the first reference page that is the previous page of the designation page. For example, the acquisition processing portion 53 acquires the coverage rate of the first reference page on the basis of the density of each pixel included in the image data of the first reference page in the document read by the reading processing portion 51.

When the printing mode is set to single-sided printing, the acquisition processing portion 53 may set the next page of the designation page as the first reference page and may acquire the coverage rate of the first reference page, or may set each of the previous page and the next page of the designation page as the first reference page and may acquire the coverage rate of each first reference page.

The first printing processing portion 54 prints a partial document including the designation page, of the document. For example, in accordance with the printing mode that is set on the setting operation screen, the first printing processing portion 54 prints the partial document of the document read by the reading processing portion 51, on a single surface or both surfaces of each sheet conveyed by the sheet feed portion 4 from the first sheet feed cassette 41, which is selected in advance as a conveyance source of a sheet to be used for printing.

Here, when the printing mode is set to single-sided printing, the range of the partial document is different depending on whether the coverage rate of the first reference page acquired by the acquisition processing portion 53 exceeds a predetermined threshold. Specifically, when the coverage rate of the first reference page acquired by the acquisition processing portion 53 exceeds the threshold, the partial document includes the designation page and the first reference page. When the coverage rate of the first reference page acquired by the acquisition processing portion 53 is equal to or less than the threshold, the partial document includes not only the designation page and the first reference page but also a second reference page that is the previous page or the next page of the first reference page. For example, the threshold is arbitrarily settable in accordance with a user operation on the operation display portion 6.

When the first reference page is the previous page of the designation page, the second reference page is the previous page of the first reference page. When the first reference page is the next page of the designation page, the second reference page is the next page of the first reference page. When the first reference page is each of the previous page and the next page of the designation page, the second reference page is each of the previous page of the first reference page that is the previous page of the designation page and the next page of the first reference page that is the next page of the designation page.

When the printing mode is set to double-sided printing, the range of the partial document is different depending on whether the printing position for the designation page is changed from the back surface of the sheet to the front surface of the sheet and whether the coverage rate of the first reference page acquired by the acquisition processing portion 53 exceeds the threshold. Specifically, if the coverage rate of the first reference page exceeds the threshold when the printing position for the designation page is changed, the partial document includes the designation page, the next page of the designation page, and the first reference page that is the previous page of the designation page. If the coverage rate of the first reference page is equal to or less than the threshold when the printing position for the designation page is changed, the partial document includes the designation page, the next page of the designation page, the first reference page that is the previous page of the designation page, the second reference page that is the previous page of the first reference page, and the previous page of the second reference page. When the printing position for the designation page is not changed, the partial document includes the designation page, the next page of the designation page, the first reference page that is the previous page of the designation page, and the second reference page that is the previous page of the first reference page.

For example, on the basis of the image data of the document read by the reading processing portion 51 and the printing mode, the printing condition, and the designation page that are set on the setting operation screen, the first printing processing portion 54 generates first print data in which printing timing, a feed source of a sheet to be printed, and the printing position on the sheet are set per page of the document.

Then, when the printing mode is set to single-sided printing, the first printing processing portion 54 specifies the range of the partial document on the basis of the coverage rate of the first reference page acquired by the acquisition processing portion 53, and prints the partial document the range of which has been specified, on the basis of the first print data. When the printing mode is set to double-sided printing, the first printing processing portion 54 specifies the range of the partial document on the basis of the first print data and the coverage rate of the first reference page acquired by the acquisition processing portion 53, and prints the partial document the range of which has been specified, on the basis of the first print data.

When a plurality of the designation pages are present, the first printing processing portion 54 prints the partial document corresponding to each of the plurality of the designation pages. When the printing condition is set to the first printing condition, even if the partial document includes the designation page and the previous page of the designation page, the first printing processing portion 54 prints the partial document without inserting the sheet placed on the second sheet feed cassette 42, between the designation page and the previous page of the designation page.

After the partial document is printed by the first printing processing portion 54, the second receiving processing portion 55 receives a confirmation operation and a change operation for the designation page designated by the designation operation. For example, the second receiving processing portion 55 causes the operation display portion 6 to display a setting change screen used for the confirmation operation and the change operation for the designation page. Here, the confirmation operation is an example of a predetermined confirmation operation in the present disclosure. The change operation is an example of a predetermined change operation in the present disclosure.

When the confirmation operation is received on the setting change screen, the informing processing portion 56 informs a first message that prompts placement of the partial document printed by the first printing processing portion 54, on the manual tray 43.

For example, the informing processing portion 56 causes the operation display portion 6 to display a first informing screen including the first message. For example, on the first informing screen, it is possible to perform an execution operation for executing the printing process by the second printing processing portion 57 on the basis of the printing mode, the printing condition, and the designation page that are set on the setting operation screen.

In addition, when the designation page is changed in accordance with the change operation received on the setting change screen, the informing processing portion 56 informs document identification information with which a changed document whose printing result changes in accordance with the change operation, of the partial document printed by the first printing processing portion 54, is identifiable, and also informs a second message that prompts removal of the changed document from the partial document and placement of the resultant document on the manual tray 43. Here, the second message is an example of a message in the present disclosure.

For example, in the case where the printing mode is set to single-sided printing or double-sided printing and the printing condition is set to the second printing condition in the image forming apparatus 10, when the designation page is changed by the change operation, the printing result of the designation page before the change by the change operation changes in accordance with the change operation.

In the case where the printing mode is set to double-sided printing and the printing condition is set to the first printing condition or the third printing condition in the image forming apparatus 10, when the designation page is changed by the change operation from a page the printing position for which is set to the front surface of the sheet to a page the printing position for which is set to the back surface of the sheet, and when the designation page is changed by the change operation from a page the printing position for which is set to the back surface of the sheet to a page the printing position for which is set to the front surface of the sheet, the printing result of the designation page before the change by the change operation changes in accordance with the change operation in some cases.

For example, the document identification information is a part or the entirety of an image of the changed document. The document identification information may be the order in which the printed matter printed by the first printing processing portion 54 is discharged to the sheet discharge tray 39.

For example, the informing processing portion 56 causes the operation display portion 6 to display a second informing screen including the document identification information and the second message. For example, on the second informing screen, it is possible to perform an execution operation for executing the printing process by the third printing processing portion 58 on the basis of the printing mode and the printing condition that are set on the setting operation screen and the designation page that is changed in accordance with the change operation received on the setting change screen.

In accordance with the confirmation operation after printing by the first printing processing portion 54, the second printing processing portion 57 prints the remaining document obtained by excluding the partial document from the document. For example, in accordance with the printing mode that is set on the setting operation screen, the second printing processing portion 57 prints the remaining document on a single surface or both surfaces of each sheet conveyed by the sheet feed portion 4 from the first sheet feed cassette 41, which is selected in advance as a conveyance source of a sheet to be used for printing.

For example, the second printing processing portion 57 prints the remaining document on the basis of the first print data.

Here, at timing after the previous page of the partial document is printed or before the next page of the partial document is printed, the second printing processing portion 57 causes the sheet feed portion 4 to discharge the sheets the number of which is equal to the number of sheets of the partial document to be printed by the first printing processing portion 54, from the manual tray 43 to the sheet discharge tray 39. For example, when the partial document includes the initial page of the document, the second printing processing portion 57 causes the sheet feed portion 4 to discharge the sheets from the manual tray 43 to the sheet discharge tray 39, at timing before the next page of the partial document is printed. When the partial document includes the final page of the document, the second printing processing portion 57 causes the sheet feed portion 4 to discharge the sheets from the manual tray 43 to the sheet discharge tray 39, at timing after the previous page of the partial document is printed. When the partial document does not include both the initial page and the final page of the document, the second printing processing portion 57 causes the sheet feed portion 4 to discharge the sheets from the manual tray 43 to the sheet discharge tray 39, at timing after the previous page of the partial document is printed.

For example, at the printing timing for the partial document which printing timing is acquired on the basis of the first print data, the second printing processing portion 57 causes the sheet feed portion 4 to discharge the sheets the number of which is equal to the number of sheets of the partial document to be printed by the first printing processing portion 54, from the manual tray 43 to the sheet discharge tray 39, instead of printing the partial document. When the printing condition is set to the first printing condition, the second printing processing portion 57 causes the sheet feed portion 4 to discharge the sheets from the second sheet feed cassette 42 to the sheet discharge tray 39, on the basis of the printing timing for the designation page which printing timing is acquired on the basis of the first print data.

When the designation page is changed in accordance with the change operation after printing by the first printing processing portion 54, the third printing processing portion 58 prints the remaining document and the changed document whose printing result changes in accordance with the change operation, of the partial document. For example, in accordance with the printing mode that is set on the setting operation screen, the third printing processing portion 58 prints the remaining document and the changed document on a single surface or both surfaces of each sheet conveyed by the sheet feed portion 4 from the first sheet feed cassette 41, which is selected in advance as a conveyance source of a sheet to be used for printing.

For example, on the basis of the image data of the document read by the reading processing portion 51, the printing mode and the printing condition that are set on the setting operation screen, and the designation page that is changed in accordance with the change operation received on the setting change screen, the third printing processing portion 58 generates second print data in which printing timing, a feed source of a sheet to be printed, and the printing position on the sheet are set per page of the document. Next, on the basis of the first print data and the second print data, the third printing processing portion 58 specifies the changed document from the partial document and an unchanged document obtained by excluding the changed document from the partial document. Then, the third printing processing portion 58 prints the remaining document and the specified changed document on the basis of the second print data.

Here, at timing after the previous page of the unchanged document obtained by excluding the changed document from the partial document is printed or before the next page of the unchanged document is printed, the third printing processing portion 58 causes the sheet feed portion 4 to discharge the sheets the number of which is equal to the number of sheets of the unchanged document to be printed by the first printing processing portion 54, from the manual tray 43 to the sheet discharge tray 39. For example, when the unchanged document includes the initial page of the document, the third printing processing portion 58 causes the sheet feed portion 4 to discharge the sheets from the manual tray 43 to the sheet discharge tray 39, at timing before the next page of the unchanged document is printed. When the unchanged document includes the final page of the document, the third printing processing portion 58 causes the sheet feed portion 4 to discharge the sheets from the manual tray 43 to the sheet discharge tray 39, at timing after the previous page of the unchanged document is printed. When the unchanged document does not include both the initial page and the final page of the document, the third printing processing portion 58 causes the sheet feed portion 4 to discharge the sheets from the manual tray 43 to the sheet discharge tray 39, at timing after the previous page of the unchanged document is printed.

For example, at the printing timing for the unchanged document which printing timing is acquired on the basis of the second print data, the third printing processing portion 58 causes the sheet feed portion 4 to discharge the sheets the number of which is equal to the number of sheets of the unchanged document to be printed by the first printing processing portion 54, from the manual tray 43 to the sheet discharge tray 39, instead of printing the unchanged document. When the printing condition is set to the first printing condition, the third printing processing portion 58 causes the sheet feed portion 4 to discharge the sheets from the second sheet feed cassette 42 to the sheet discharge tray 39, on the basis of the printing timing for the designation page which printing timing is acquired on the basis of the second print data.

[Printing Control Process]

Figure 3:
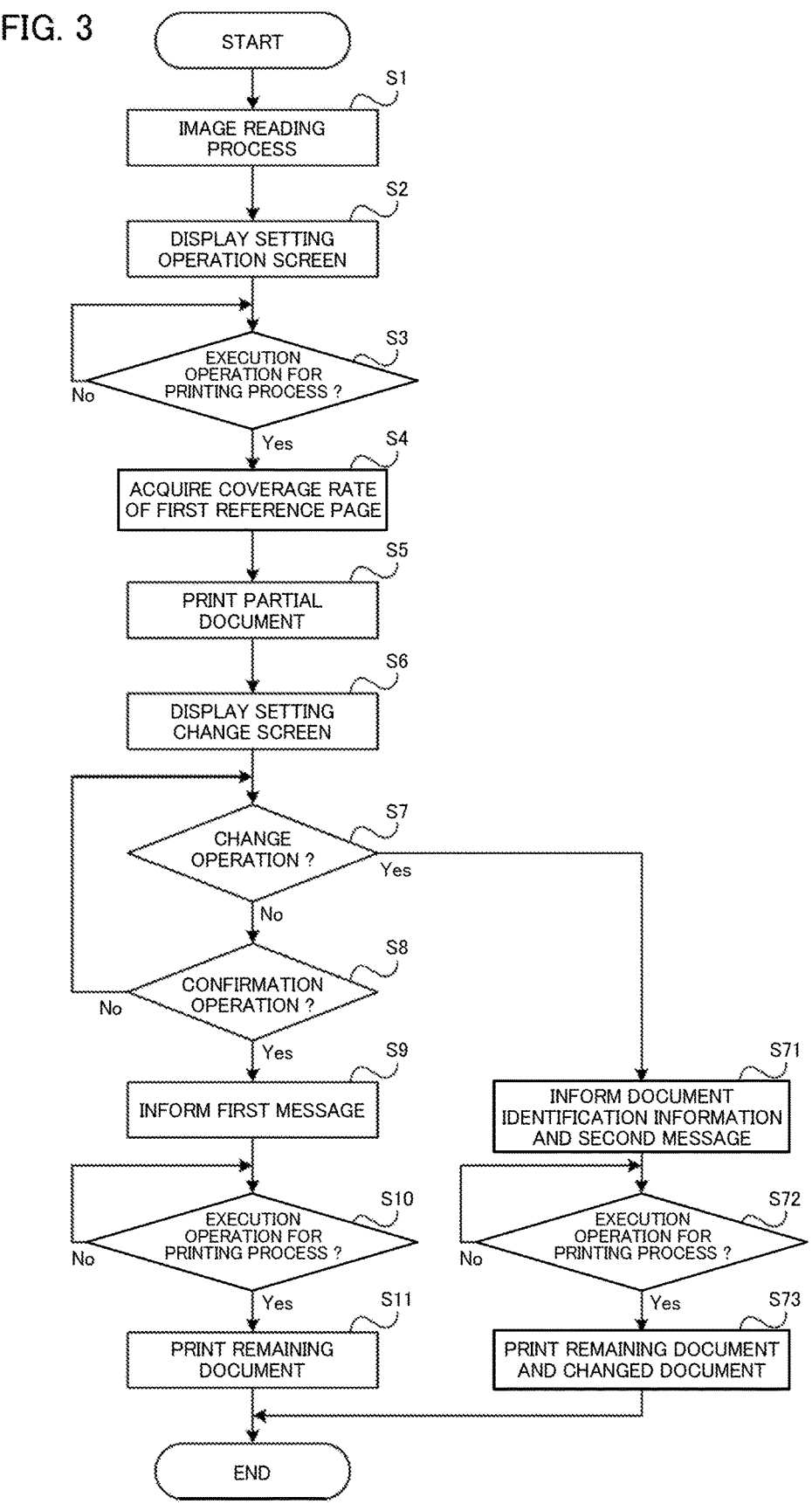
FIG. 3 is a flowchart showing an example of a printing control process executed by the image forming apparatus according to the embodiment of the present disclosure.

Hereinafter, an example of a procedure of the printing control process executed by the control portion 5 in the image forming apparatus 10 will be described with reference to FIG. 3. Here, steps S1, S2 . . . represent numbers of process procedures (steps) executed by the control portion 5. The printing control process is executed when a user operation for instructing execution of the printing control process is performed on the operation display portion 6.

<Step S1>

First, in step S1, the control portion 5 controls the ADF 1 and the image reading portion 2 to execute the image reading process of reading the image on each page of the document placed on the document set portion of the ADF 1. Here, the process in step S1 is executed by the reading processing portion 51 of the control portion 5.

Instead of the process in step S1, the control portion 5 may execute a process of acquiring image data of a document from a storage portion such as a USB memory connected to the image forming apparatus 10.

<Step S2>

In step S2, the control portion 5 causes the operation display portion 6 to display the setting operation screen, and receives a setting operation for the printing mode, a setting operation for the printing condition, and the designation operation for the designation page. In addition, on the setting operation screen, the control portion 5 receives an execution operation for executing the printing process on the basis of the set printing mode, the set printing condition, and the set designation page. Here, the process in step S2 is an example of a first step in the present disclosure and is executed by the first receiving processing portion 52 of the control portion 5.

<Step S3>

In step S3, the control portion 5 determines whether the execution operation for the printing process has been performed on the setting operation screen displayed in step S2.

Here, when the control portion 5 determines that the execution operation for the printing process has been performed (Yes in S3), the control portion 5 shifts the process to step S4. When the execution operation for the printing process has not been performed (No in S3), the control portion 5 waits in step S3 for the execution operation for the printing process being performed.

<Step S4>

In step S4, the control portion 5 acquires the coverage rate of the first reference page that is the previous page of the designation page that is set on the setting operation screen displayed in step S2. Here, the process in step S4 is executed by the acquisition processing portion 53 of the control portion 5. The process in step S4 may be omitted.

<Step S5>

In step S5, the control portion 5 prints the partial document including the designation page, of the document read in step S1. Here, the process in step S5 is an example of a second step in the present disclosure and is executed by the first printing processing portion 54 of the control portion 5.

For example, the control portion 5 generates the first print data on the basis of the image data of the document read in step S1, and the printing mode, the printing condition, and the designation page that are set on the setting operation screen displayed in step S2. Then, when the printing mode is set to single-sided printing, the control portion 5 specifies the range of the partial document on the basis of the coverage rate of the first reference page acquired in step S4, and prints the partial document the range of which has been specified, on the basis of the first print data. When the printing mode is set to double-sided printing, the control portion 5 specifies the range of the partial document on the basis of the first print data and the coverage rate of the first reference page acquired in step S4, and prints the partial document the range of which has been specified, on the basis of the first print data.

Here, in the image forming apparatus 10, when the coverage rate of the first reference page acquired in step S4 is equal to or less than the threshold, the range of the partial document is extended to the second reference page. Accordingly, an operation for confirming whether there is an error in designation of the designation page on the basis of the contents of the first reference page is inhibited from becoming difficult due to the coverage rate of the first reference page being low.

In the case where the process in step S4 is omitted, when the printing mode is set to single-sided printing, the range of the partial document includes the designation page and the first reference page. When the printing mode is set to double-sided printing, the range of the partial document is different depending on whether the printing position for the designation page is changed from the back surface of the sheet to the front surface of the sheet. Specifically, when the printing position for the designation page is changed, the range of the partial document includes the designation page, the next page of the designation page, and the first reference page that is the previous page of the designation page. When the printing position for the designation page is not changed, the range of the partial document includes the designation page, the next page of the designation page, the first reference page that is the previous page of the designation page, and the second reference page that is the previous page of the first reference page.

When a plurality of the designation pages are present, the control portion 5 prints the partial document corresponding to each of the plurality of the designation pages. When the printing condition is set to the first printing condition, even if the partial document includes the designation page and the previous page of the designation page, the control portion 5 prints the partial document without inserting the sheet placed on the second sheet feed cassette 42, between the designation page and the previous page of the designation page.

When the designation page is not set on the setting operation screen displayed in step S2, the control portion 5 prints the document read in step S1 and ends the printing control process.

<Step S6>

In step S6, the control portion 5 causes the operation display portion 6 to display the setting change screen, and receives the confirmation operation and the change operation for the designation page designated by the designation operation. Here, the process in step S6 is executed by the second receiving processing portion 55 of the control portion 5.

<Step S7>

In step S7, the control portion 5 determines whether the change operation has been performed on the setting change screen displayed in step S6.

Here, when the control portion 5 determines that the change operation has been performed (Yes in S7), the control portion 5 shifts the process to step S71. When the change operation has not been performed (No in S7), the control portion 5 shifts the process to step S8.

<Step S8>

In step S8, the control portion 5 determines whether the confirmation operation has been performed on the setting change screen displayed in step S6.

Here, when the control portion 5 determines that the confirmation operation has been performed (Yes in S8), the control portion 5 shifts the process to step S9. When the confirmation operation has not been performed (No in S8), the control portion 5 shifts the process to step S7 and waits for the change operation or the confirmation operation being performed.

<Step S9>

In step S9, the control portion 5 causes the operation display portion 6 to display the first informing screen including the first message, which prompts placement of the partial document printed in step S5 on the manual tray 43, thereby informing the first message. Here, the process in step S9 is executed by the informing processing portion 56 of the control portion 5.

<Step S10>

In step S10, the control portion 5 determines whether an execution operation for the printing process has been performed on the first informing screen displayed in step S9.

Here, when the control portion 5 determines that the execution operation for the printing process has been performed (Yes in S10), the control portion 5 shifts the process to step S11. When the execution operation for the printing process has not been performed (No in S10), the control portion 5 waits in step S10 for the execution operation for the printing process being performed.

The processes in steps S9 and S10 may be omitted. In this case, when the control portion 5 determines in step S8 that the confirmation operation has been performed (Yes in S8), the control portion 5 shifts the process to step S11.

<Step S11>

In step S11, the control portion 5 prints the remaining document obtained by excluding the partial document printed in step S5 from the document read in the step S1. Here, the process in step S11 is an example of a third step in the present disclosure and is executed by the second printing processing portion 57 of the control portion 5.

For example, the control portion 5 prints the remaining document on the basis of the first print data.

Here, at the printing timing for the partial document which printing timing is acquired on the basis of the first print data, the control portion 5 causes the sheet feed portion 4 to discharge the sheets the number of which is equal to the number of sheets of the partial document to be printed in step S5, from the manual tray 43 to the sheet discharge tray 39, instead of printing the partial document. Accordingly, it is possible to reduce time and effort for the user to insert the partial document printed in step S5 to an appropriate location in the remaining document printed in step S11.

When the printing condition is set to the first printing condition, the control portion 5 causes the sheet feed portion 4 to discharge the sheets from the second sheet feed cassette 42 to the sheet discharge tray 39, on the basis of the printing timing for the designation page which printing timing is acquired on the basis of the first print data.

The process, in step S11, of causing the sheet feed portion 4 to discharge the sheets from the manual tray 43 to the sheet discharge tray 39 may be omitted.

<Step S71>

On the other hand, when it is determined in step S7 that the change operation has been performed, the control portion 5 executes a process in step S71. In step S71, the control portion 5 causes the operation display portion 6 to display the second informing screen including the document identification information, with which the changed document is identifiable, and the second message, which prompts removal of the changed document from the partial document and placement of the resultant document on the manual tray 43, thereby informing the document identification information and the second message. Here, the process in step S71 is executed by the informing processing portion 56 of the control portion 5. Accordingly, it is possible to reduce time and effort for the user to identify and remove the changed document from the partial document printed in step S5.

<Step S72>

In step S72, the control portion 5 determines whether an execution operation for the printing process has been performed on the second informing screen displayed in step S71.

Here, when the control portion 5 determines that the execution operation for the printing process has been performed (Yes in S72), the control portion 5 shifts the process to step S73. When the execution operation for the printing process has not been performed (No in S72), the control portion 5 waits in step S72 for the execution operation for the printing process being performed.

The processes in steps S71 and S72 may be omitted. In this case, when the control portion 5 determines in step S7 that the change operation has been performed (Yes in S7), the control portion 5 shifts the process to step S73.

<Step S73>

In step S73, the control portion 5 prints the remaining document obtained by excluding the partial document printed in step S5 from the document read in step S1, and the changed document whose printing result changes in accordance with the change operation, of the partial document. Here, the process in step S73 is executed by the third printing processing portion 58 of the control portion 5. Accordingly, even when the change operation has been performed, it is possible to avoid printing a printed matter whose printing result overlaps the printing result of the partial document.

For example, the control portion 5 generates the second print data on the basis of the image data of the document read in step S1, the printing mode and the printing condition that are set on the setting operation screen displayed in step S2, and the designation page that is changed in accordance with the change operation received on the setting change screen displayed in step S6. Next, the control portion 5 specifies the changed document and the unchanged document from the partial document on the basis of the first print data and the second print data. Then, the control portion 5 prints the remaining document and the specified changed document on the basis of the second print data.

Here, at the printing timing for the unchanged document which printing timing is acquired on the basis of the second print data, the control portion 5 causes the sheet feed portion 4 to discharge the sheets the number of which is equal to the number of sheets of the unchanged document to be printed in step S5, from the manual tray 43 to the sheet discharge tray 39, instead of printing the unchanged document. Accordingly, it is possible to reduce time and effort for the user to insert the unchanged document printed in step S5 to an appropriate location in the remaining document and the changed document printed in step S73.

When the printing condition is set to the first printing condition, the control portion 5 causes the sheet feed portion 4 to discharge the sheets from the second sheet feed cassette 42 to the sheet discharge tray 39 on the basis of the printing timing for the designation page which printing timing is acquired on the basis of the second print data.

The process, in step S73, of causing the sheet feed portion 4 to discharge the sheets from the manual tray 43 to the sheet discharge tray 39 may be omitted.

Figure 4:
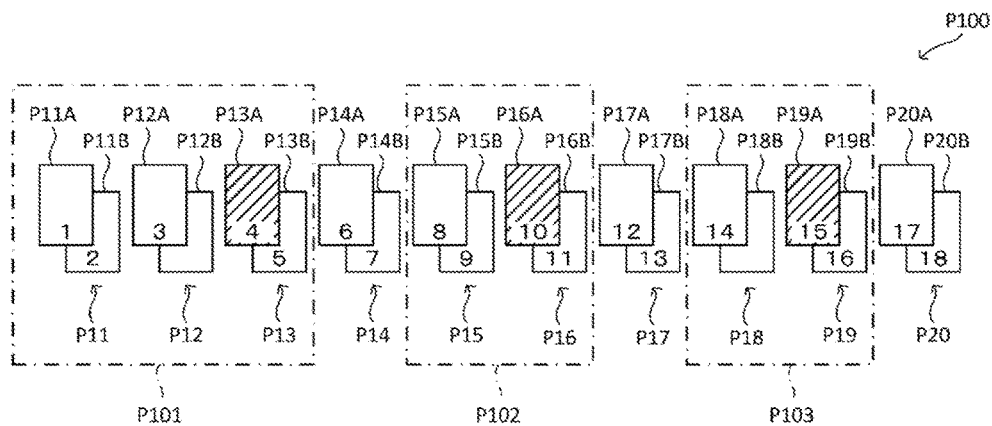
FIG. 4 is a diagram showing an example of a printed matter printed by the image forming apparatus according to the embodiment of the present disclosure.

Here, the partial document and the remaining document printed by execution of the printing control process in the image forming apparatus 10 will be described with reference to FIG. 4. Here, FIG. 4 is a diagram showing a printed matter P100 including the partial document and the remaining document printed on the basis of the first print data. The printed matter P100 includes sheets P11 to P20.

In FIG. 4, the sheets P11 to P20 have front surfaces P11A to P20A and back surfaces P11B and P20B, respectively. In addition, in FIG. 4, a number assigned to each of the front surfaces P11A to P20A and the back surfaces P11B and P20B of the sheets P11 to P20 indicates a page number of a document printed on each of the front surfaces P11A to P20A and the back surfaces P11B and P20B. Moreover, hatching in FIG. 4 indicates the designation page. Furthermore, each alternate long and short dash line in FIG. 4 indicates the range of each of partial documents P101 to P103.

In the following, the case where a document including 18 pages is read in the printing control process and the printing mode, the printing condition, and the designation page are set to double-sided printing, the third printing condition, and pages 4, 10, and 15, respectively, will be described as an example. In addition, the description will be given on the assumption that the coverage rate of page 3 of the document shown in FIG. 4 is less than the threshold and the coverage rate of each of pages 9 and 14 of the document exceeds the threshold.

As shown in FIG. 4, in the image forming apparatus 10, when the printing mode, the printing condition, and the designation page are set to double-sided printing, the third printing condition, and pages 4, 10, and 15, respectively, and the document including 18 pages is printed, the respective pages of the document are sequentially assigned to the front surfaces P11A to P20A and the back surfaces P11B and P20B of the sheets P11 to P20 and the document is printed.

Here, the original printing position for page 4 of the document is the back surface P12B of the sheet P12, but page 4 of the document is set as the designation page. Thus, in the first print data, the printing position for page 4 of the document is changed from the back surface P12B of the sheet P12 to the front surface P13A of the sheet P13 to be conveyed next by the sheet feed portion 4. In addition, in accordance with the change of the printing position for page 4 of the document, the printing position for each of page 5 and the subsequent pages of the document is also changed. Accordingly, the printing position for page 10 of the document, which is set as the designation page, is changed from the back surface P15B of the sheet P15 to the front surface P16A of the sheet P16. In addition, the printing position for page 15 of the document, which is set as the designation page, is changed from the front surface P18A of the sheet P18 to the back surface P18B of the sheet P18. Thus, in the first print data, the printing position for page 15 of the document is changed from the back surface P18B of the sheet P18 to the front surface P19A of the sheet P19.

In the example shown in FIG. 4, as the partial document P101 including page 4 (the designation page) of the document, the sheet P11 is printed such that page 1 (the previous page of the second reference page) and page 2 (the second reference page) of the document are printed on the front surface P11A and the back surface P11B, respectively, the sheet P12 is printed such that page 3 (the first reference page) of the document is printed on the front surface P12A, and the sheet P13 is printed such that page 4 (the designation page) and page 5 (the next page of the designation page) of the document are printed on the front surface P13A and the back surface P13B, respectively. In addition, as the partial document P102 including page 10 (the designation page) of the document, the sheet P15 is printed such that page 8 (the second reference page) and page 9 (the first reference page) of the document are printed on the front surface P15A and the back surface P15B, respectively, and the sheet P16 is printed such that page 10 (the designation page) and page 11 (the next page of the designation page) of the document are printed on the front surface P16A and the back surface P16B, respectively. Moreover, as the partial document P103 including page 15 (the designation page) of the document, the sheet P18 is printed such that page 14 (the first reference page) of the document is printed on the front surface P18A, and the sheet P19 is printed such that page 15 (the designation page) and page 16 (the next page of the designation page) of the document are printed on the front surface P19A and the back surface P19B, respectively.

In the example shown in FIG. 4, when the change operation for the designation page is not performed, as the remaining document, the sheet P14 is printed such that page 6 and page 7 of the document are printed on the front surface P14A and the back surface P14B, respectively, the sheet P17 is printed such that page 12 and page 13 of the document are printed on the front surface P17A and the back surface P17B, respectively, and the sheet P20 is printed such that page 17 and page 18 of the document are printed on the front surface P20A and the back surface P20B, respectively.

Figure 5:
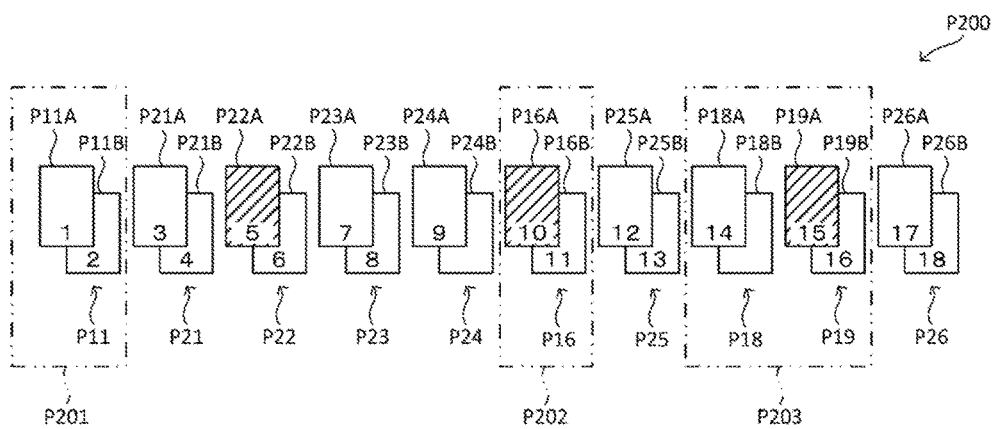
FIG. 5 is a diagram showing an example of the printed matter printed by the image forming apparatus according to the embodiment of the present disclosure.

Next, the remaining document, the changed document, and the unchanged document in the case where the change operation for the designation page is performed in the example shown in FIG. 4 will be described with reference to FIG. 5. Here, FIG. 5 is a diagram showing a printed matter P200 including the unchanged document printed on the basis of the first print data and the remaining document and the changed document printed on the basis of the second print data. The printed matter P200 includes a sheet P11, a sheet P16, sheets P18 and P19, and sheets P21 to P26. Each alternate long and two short dashes line in FIG. 5 indicates the range of each of unchanged documents P201 to P203.

In the following, the case where the setting of the designation page is changed from page 4 of the document to page 5 of the document will be described as an example.

As shown in FIG. 5, the printing result of pages 3 to 5 of the partial document P101 shown in FIG. 4 changes as a result of the setting of the designation page being changed from page 4 of the document to page 5 of the document. Thus, the control portion 5 specifies pages 1 and 2 of the document as the unchanged document P201. In addition, the control portion 5 specifies pages 3 to 5 of the document as the changed document, and prints pages 3 to 5 of the document on the sheets P21 and P22 together with page 6 of the remaining document.

As shown in FIG. 5, the printing result of pages 8 and 9 of the partial document P102 shown in FIG. 4 changes as a result of the setting of the designation page being changed from page 4 of the document to page 5 of the document. Thus, the control portion 5 specifies pages 10 and 11 of the document as the unchanged document P202. In addition, the control portion 5 specifies pages 8 and 9 of the document as the changed document, and prints pages 8 and 9 of the document on the sheets P23 and P24 together with page 7 of the remaining document.

As shown in FIG. 5, when the setting of the designation page is changed from page 4 of the document to page 5 of the document, the printing result of pages 14 to 16 included in the partial document P103 shown in FIG. 4 does not change. Thus, the control portion 5 specifies pages 14 to 16 of the document as the unchanged document P203. In addition, the control portion 5 prints pages 12 and 13 of the remaining document and pages 17 and 18 of the remaining document on the sheets P25 and P26, respectively.

As described above, in the printing control process, after the partial document to be used for confirming whether there is an error in the designation operation for designating the designation page to which the printing condition is to be applied, of the document including a plurality of pages, is printed, if the confirmation operation is received, the remaining document obtained by excluding the partial document is printed. Accordingly, it is possible to inhibit a printed matter whose printing result overlaps the printing result of the printed matter printed for confirming page designation, from being printed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a receiving processing portion configured to receive an operation for designating a designation page to which a predetermined printing condition is to be applied, of a document including a plurality of pages;
a first printing processing portion configured to print a partial document including the designation page, of the document;
a second printing processing portion configured to print a remaining document obtained by excluding the partial document from the document, in accordance with a predetermined confirmation operation after the printing by the first printing processing portion;
a plurality of sheet placement portions on which sheets are placed; and
a sheet conveying portion configured to convey the sheets from the plurality of sheet placement portions to a discharge portion, wherein
the first printing processing portion and the second printing processing portion print the pages of the document on a single surface or both surfaces of each of the sheets conveyed by the sheet conveying portion from the sheet placement portion that is selected in advance, and
the printing condition includes any one or more of:
a first printing condition that is to cause the sheet conveying portion to discharge the sheets from the sheet placement portion different from the selected sheet placement portion to the discharge portion at a timing between printing of the designation page and printing of a previous page of the designation page;
a second printing condition that is to print the designation page on the sheet conveyed from the sheet placement portion different from the selected sheet placement portion; and
a third printing condition that is to, when a printing position, for the designation page, on the sheet conveyed by the sheet conveying portion is set to a back surface of the sheet, change setting of the printing position for the designation page to a front surface of the sheet to be conveyed next by the sheet conveying portion.

2. The image forming apparatus according to claim 1, further comprising a third printing processing portion configured to, when the designation page is changed in accordance with a predetermined change operation after the printing by the first printing processing portion, print the remaining document and a changed document whose printing result changes in accordance with the change operation, of the partial document.

3. The image forming apparatus according to claim 1, further comprising an acquisition processing portion configured to acquire a coverage rate of a first reference page that is one of or both the previous page and a next page of the designation page, wherein when the coverage rate of the first reference page exceeds a predetermined threshold, the partial document includes the designation page and the first reference page; and when the coverage rate of the first reference page is equal to or less than the threshold, the partial document includes not only the designation page and the first reference page but also a second reference page that is a previous page or a next page of the first reference page.

4. The image forming apparatus according to claim 3, wherein when the document is printed by double-sided printing, the acquisition processing portion acquires the coverage rate of the first reference page that is the previous page of the designation page, and if the coverage rate of the first reference page exceeds the threshold when the printing position for the designation page is changed, the partial document includes the designation page, the next page of the designation page, and the first reference page; if the coverage rate of the first reference page is equal to or less than the threshold when the printing position for the designation page is changed, the partial document includes the designation page, the next page of the designation page, the first reference page, the second reference page, and a previous page of the second reference page; and when the printing position for the designation page is not changed, the partial document includes the designation page, the next page of the designation page, the first reference page, and the second reference page.

5. The image forming apparatus according to claim 1, further comprising an image reading portion capable of reading image data from the document.

6. An image forming method executed by an image forming apparatus including a plurality of sheet placement portions on which sheets are placed, and a sheet conveying portion configured to convey the sheets from the plurality of sheet placement portions to a discharge portion, the image forming method comprising:

a first step of receiving an operation for designating a designation page to which a predetermined printing condition is to be applied, of a document including a plurality of pages;

a second step of printing a partial document including the designation page, of the document; and a third step of printing a remaining document obtained by excluding the partial document from the document, in accordance with a predetermined confirmation operation after the printing in the second step, wherein the first step and the second step print the pages of the document on a single surface or both surfaces of each of the sheets conveyed by the sheet conveying portion from the sheet placement portion that is selected in advance, and the printing condition includes any one or more of:

a first printing condition that is to cause the sheet conveying portion to discharge the sheets from the sheet placement portion different from the selected sheet placement portion to the discharge portion at a timing between printing of the designation page and printing of a previous page of the designation page;

a second printing condition that is to print the designation page on the sheet conveyed from the sheet placement portion different from the selected sheet placement portion; and a third printing condition that is to, when a printing position, for the designation page, on the sheet conveyed by the sheet conveying portion is set to a back surface of the sheet, change setting of the printing position for the designation page to a front surface of the sheet to be conveyed next by the sheet conveying portion.

* * * * *